United States Patent
Arkko

(10) Patent No.: US 6,744,737 B1
(45) Date of Patent: Jun. 1, 2004

(54) METHOD AND ARRANGEMENT IN COMMUNICATION NETWORKS FOR MANAGING USER RELATED FEATURES THROUGH A USER INTERFACE

(75) Inventor: Jari Arkko, Kauniainen (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/449,861

(22) Filed: Nov. 29, 1999

Related U.S. Application Data

(63) Continuation of application No. PCT/FI98/00440, filed on May 26, 1998.

(30) Foreign Application Priority Data

May 30, 1997 (FI) .................................................. 972319

(51) Int. Cl.[7] .................................................. H04J 1/16
(52) U.S. Cl. ..................... 370/252; 370/389; 379/88.23; 379/244; 709/203; 709/250; 455/445
(58) Field of Search ............................ 379/88.17, 88.2, 379/88.23, 88.25, 93.01, 93.03, 93.05, 142.07, 142.15, 221.02, 221.08, 244, 247; 370/252, 353, 389, 401, 410; 709/203, 225, 229, 250; 707/512; 455/445

(56) References Cited

U.S. PATENT DOCUMENTS

| | | | |
|---|---|---|---|
| 5,537,461 A | * | 7/1996 | Bridges et al. ........... 379/88.17 |
| 5,608,786 A | * | 3/1997 | Gordon ........................ 379/88 |
| 5,675,507 A | * | 10/1997 | Bobo, II .................. 379/93.24 |
| 6,233,318 B1 | * | 5/2001 | Picard et al. ............ 379/88.17 |

FOREIGN PATENT DOCUMENTS

| | | |
|---|---|---|
| EP | 0 643 541 A1 | 3/1995 |
| WO | 94/23523 A1 | 10/1994 |
| WO | 97/06625 A1 * | 2/1997 |
| WO | 97/23988 A1 | 7/1997 |
| WO | 97/44943 A1 | 11/1997 |

OTHER PUBLICATIONS

R. Atkinson, "IP Encapsulating Security Payload (ESP)," 1995, Naval Research Laboratory, p. 5, chapter 4.1.

* cited by examiner

*Primary Examiner*—Kwang Bin Yao
*Assistant Examiner*—Afsar M. Qureshi
(74) *Attorney, Agent, or Firm*—Nixon & Vanderhye P.C.

(57) ABSTRACT

A communications network is managed so that a user is enabled to manage user-related features provided in the network through a user interface. A call is established to a server provided with a feature management service including an individual register of characteristics and available features for predetermined user interfaces. The user's access to the network through the user interface to the server is then terminated. At least one characteristic of the user interface is used to identify the user interface. That characteristic is input into the server to enable the user to manage features associated with the characteristic.

20 Claims, 3 Drawing Sheets

METHOD AND ARRANGEMENT IN COMMUNICATION NETWORKS FOR MANAGING USER RELATED FEATURES THROUGH A USER INTERFACE

This is a continuation of PCT International Application No. PCT/FI/98/00440 file on May 26, 1998.

FIELD OF THE INVENTION

The present invention relates to a method for managing the configuration and/or operation of various features of telecommunication networks. The invention relates further to an arrangement for accomplishing the managing operations of the telecommunication network features.

BACKGROUND OF THE INVENTION

Modern telecommunication networks provide various sophisticated features and/or services available to subscribers. These services are in most cases provided and run by the telephone companies (operators) and include features such as call forwarding, wake-up calls, answering services, directory services, text and voice mails etc. These services may be implemented, e.g. in a so-called Intelligent Network (IN).

Conventionally these services have been relatively difficult to use. In particular, the configuration thereof, e.g. the installation/removal and activation/deactivation and/or other changes thereof, requires in most cases the assistance of the telephone company. Some of the configurations are also such that they can be accomplished only by the telephone company, e.g. by a service person or an authorised clerk of the telephone company. To receive this kind of assistance, the subscriber has either to visit an office of the telephone company or at least to make a telephone call to them to order the desired configuration of services.

One of the reasons for this is the substantially unsophisticated and limited user interface of conventional telephone terminals (a simple keypad with numbers 0 . . . 9 and hash (#) and star (*)) The required key combinations are often long and hard to remember, and the lack of guidance to the user causes mistakes, or even dissuades the user from even trying. In addition, the conventional telephone systems and terminals do not give much feedback, if at all, after the subscriber has keyed in the instructions through the keypad. The nature of the user interface also limits the number and flexibility of the services that can be effectively and readily used.

To overcome the above problems, improved network arrangements and/or telephone terminals have been suggested. For instance, the performance of conventional POTS connections (Plain Old Telephone Service) is improved, e.g. by the so-called ISDN connection (Integrated Services Digital Network). Improved telephone terminals are also suggested, especially in connection with advanced connections such as the ISDN. These are intended to provide the user with an improved interface for setting, configuring, and modifying operations of the various features and/or services.

It is characteristic of ISDN that the user may utilise several communications services either separately or simultaneously. Different applications, which consist of a terminal device, a group of terminal devices, a multiservice switch, a local network, another private network etc., are connected to the ISDN by a limited user access group. The ISDN network enables the development of the conventional telephone to form a part of a multiservice terminal, such as a combination of a telephone and a PC, which enables simultaneous transfer of speech and data. The ISDN interface between the user and the network comprises various types of channels which can be used between the subscriber and the network for information transfer.

The ISDN B-channel is a channel operating at a rate of 64 kbit/s and is provided with timing—it is used for transferring all kinds of information, e.g. in different manners coded speech or data. The ISDN D-channel, which has a transfer rate of either 16 kbit/s or 64 kbit/s, is primarily intended as a signalling channel for circuit switched connections. By combining the different channel structures user accesses are provided. A basic access has a 2B+D structure and a basic system access has a 30B+D structure. By using the basic access system, one or several terminal devices may be connected directly to the ISDN network, whereas the basic system access is used for connecting large switches and local networks to the ISDN network.

The additional features/services referred to above are usually adapted to conventional telephone terminals. It is therefore difficult to introduce more advanced features/services, or their introduction is at least difficult and/or expensive to accomplish as it is necessary to provide subscribers with more advanced terminals. This cost factor has been one of the reasons for the slow introduction of advanced features/services in telecommunications networks, especially amongst home users.

There are arrangements utilising open communications networks, such as the Internet or MAN (Metropolitan Area Network) or similar, which provide for the transmission of telephone communications. The skilled person is familiar with these, and understands that the Internet is a global open communications network connecting through PSTNs (Public Switched Telephone Network) and suitable gateways to a great number of local area networks, such as networks of various companies, universities and other organisations. The skilled man also understands that the MAN is a network covering a geographically limited area, such as a city or a province. The MAN can also be a subnet of the Internet.

The two most often used communication protocols for the Internet are TCP and IP protocols (Transport Control Protocol and Internet Protocol respectively). In most cases, various services are provided utilising so called WWW service protocol (World Wide Web), which provides a graphical Internet interface for a data processing device, such as a microcomputer. The WWW contains HTML documents (HyperText Markup Language), i.e. "hyperdocuments", one such document forming one entity which can contain text, pictures, even moving pictures, sound and links to other documents. One such document may also include several pages. A hyperdocument usually has a so-called "web master" which updates the document data.

SUMMARY OF THE INVENTION

The above explained graphical interface could give a wide range of possibilities for managing the different features and/or services available in a communications network. Features that could be controlled, e.g. by a WWW server, could, for instance, consist of the following: call forwarding and status information thereof, selection of a new feature and/or deletion of an existing feature, browsing of various available services, advance information and inspection of telephone bills, setting and removing charging limits, preventing calls from and/or to unwanted telephone numbers, telephone directory searches, additional services, such as secretary services and short messages (text or voice), etc.

In the Internet environment the access calls are usually transmitted to a modem pool of some Internet Service Provider (ISP), such as EUnet Oy in Finland. As the traffic in the Internet rapidly increases, it will become necessary to separate the Internet traffic from the other telephone communications, and to terminate the call, e.g. within a local exchange or somewhere else than at the ISP. However, the present telephone networks are not capable of terminating Internet access calls.

There remain problems which have prevented the large scale utilisation of various open communications networks for the provision, management and control of various services relating to the use and utilisation of telephone and other telecommunication arrangements. One of the main problems is the lack of reliable way to identify and authenticate the users of the networks. The other problem has relied on the privacy guarantees of the users when using the networks.

The present suggestions for providing authorisation and privacy in open networks, such as in the global Internet, usually require an agreement between the communicating parties. This has to be done beforehand, and by some other means than through the open network in question, e.g. by visiting the telephone company's office. The agreement contains in most cases an individual key (number and/or characteristic sequence) or similar identification to be dialled-in, to obtain an access to a certain service.

So-called public key algorithms have been proposed to reduce the need for such agreements, but an authentication of the subscriber requires from him/her a formation of a private-public key pair so as to enable the subscriber to "sign" his/her messages, commands, instructions etc. The widespread use of public keys would also require the existence of a suitable public key infrastructure (such as key signing authorities) which, however, do not yet exist. In addition, the acquiring of these keys requires a level of special knowledge which most ordinary users, especially the private subscribers, do not necessarily have. Another common concern relates to the possibility of intercepting and/or breaking of a password as it is transferred in the network.

Thus there is a need to be able to control the various features available in telephone or telecommunications networks in an easy and reliable manner, and such that a secure and authenticated manner for the configuration and/or use of the services and/or features in open communications networks is provided.

Therefore, it is an object of the present invention to overcome the disadvantages of the prior art solutions and to provide a new type of solution for the management of various services available in the communications networks.

An object of the present invention is also to provide an improved method and arrangement for user authentication and authorisation in communication networks.

A second object of the present invention is to provide a method and arrangement by means of which the configuration of user features can be facilitated and made more flexible.

A third object of the present invention is to provide a method and an arrangement in which graphical documents and displays can be utilised for management operations.

A fourth object of the present invention is to provide a method and an arrangement by means of which it is no longer necessary for the user to use and remember any particular keys or similar identifications codes when accessing various services and/or features of a communications network.

A fifth object of the present invention is to provide a method and an arrangement which provides a secure way for configuring features provided by the communication networks and such that the privacy of the individual users is improved.

According to a first aspect of the present invention there is provided a method for managing a communication network such that a user in a communication network environment is enabled to manage user related features provided in the network through a user interface, the method comprising the steps of:

initiating a call from the user interface to a server provided with a feature management service including an individual register of characteristics and associated available features for user interfaces;

establishing said call between the user interface and said server;

identifying the user interface by means of at least one characteristic thereof transmitted to the server during the call initiating step; and enabling the user to manage the features associated to said at least one characteristic, using said user interface.

In a preferred embodiment of the above first aspect of the present invention, the communication network is a telecommunication network enabling a subscriber to the network to make voice and data calls. The user interface is connected to the network via a subscriber line having a line identifier (e.g. A-number) associated with it. More preferably, said at least one characteristic used to identify the user interface is the line identifier.

Preferably, said call is established between the user interface and the server via a restricted access telecommunication network. More preferably, said network comprises telephone lines controlled by the communication network.

According to a second aspect of the present invention there is provided apparatus for enabling a user in a communications network environment to manage user related features provided in said network through a user interface, the apparatus comprising:

a server provided with a feature management service including an individual register of characteristics and associated available features for user interfaces;

call connection means for initiating and establishing a call from the user interface to the server;

means for identifying the user interface using at least one characteristic thereof transmitted to the server during call initiation, the server being arranged to enable the user to manage the features associated to said at least one characteristic using said user interface.

According to a third aspect of the invention there is provided a server for enabling a user to manage user related features provided in a communication network environment through a user interface, the server comprising:

a feature management service including a database containing an individual register of characteristics and associated available features for user interfaces; and means for identifying the user interface using at least one characteristic of said user interface transmitted to the server during initiation of a call between the user interface and the server, wherein said server is arranged to terminate the user's access into said communication network and to enable the user to manage the features associated to said at least one transmitted characteristic through said user interface.

Several advantages are obtained by embodiments of the present invention, as the inventive solution provides a simple, reliable, flexible and readily usable manner for the management of features provided by the communications network. The solution provides a secure authentication of the user as it always occurs by means of a particular characteristic of the user terminal or a group of related user terminals, such as by means of the A-number or particular secure code signal identification. By means of this the user may avoid having to use and remember keys or passwords or using some other cryptographic solutions.

The privacy of the user in transactions between the user and the server is made secure as no data is allowed to enter outside the used communications line, such as ISDN/POTS, from the user terminal and terminating at the server and thus the transaction signals are not allowed to enter, e.g. the global Internet or an open MAN.

As a result of the above, it is possible to use the server, such as a WWW server, for purposes that would not otherwise be possible in an open communications network environment, such as for paying bills or ordering and crediting products and/or services offered in the network. This is likely to result in increased use of the features or services, which in turn means possibilities for larger scale provision and use of various services.

The invention may be implemented without requiring complicated and expensive auxiliary apparatus, but can rather be accomplished by already existing means, e.g. initially in the transit networks and later in the local exchanges as use of the service increases. The hardware costs will not become significant as the proposed solution can be readily integrated as an additional function in a modem pool, an access server or an access server which is integrated to form a part of a telephone exchange.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF THE DRAWINGS

Figure 1:
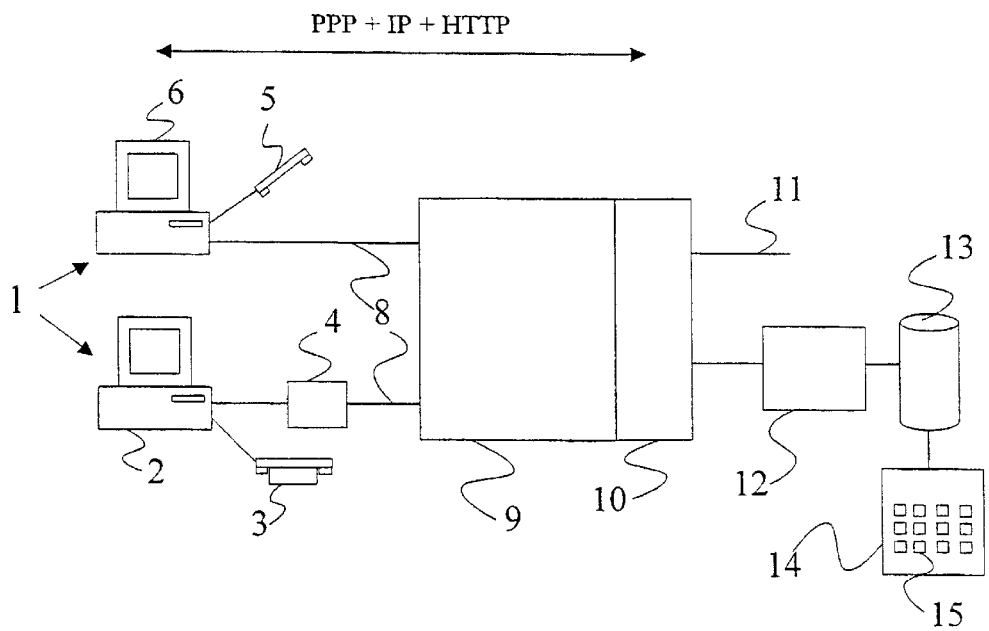
FIG. 1 is a schematic representation of one embodiment of the present invention.

FIG. 1 is a schematic representation of one preferred arrangement according to the present invention. In accordance with the embodiment, all users, i.e. subscribers, of a telecommunication network can establish a call from their advanced terminals or user interfaces 1, which preferably are in a form of data processing devices such as computers, to a common telephone number. For the purpose of clarity, FIG. 1 shows only two such terminals 1 but it is to be understood that any appropriate number of terminals of the same subscriber and/or different subscribers could be connected to the network.

The terminal 1 used in this invention may comprise a combination of a PC (personal computer) 2, a telephone 3, and a modem 4. The other terminal shown in FIG. 1 is arranged such that a handset 5 is connected directly to a computer 6, wherein the computer 6 itself includes necessary means for establishing telephone calls, i.e. an integrated modem card, so that no external modems are required.

The above mentioned common telephone number routes a call from a subscriber line 8 to a telephone exchange 9 of the telecommunication network. The call may be routed through several exchanges linked to each other (not shown) by trunks etc. Associated with the exchange 9 is a so-called access node 10 owned and/or operated by the operator of the telecommunication network. The access node 10 may be an integrated part of the exchange 9 or a separate unit connected to the exchange 9. The access node 10 provides a connection to other communications networks, such as the networks of other operators, or the Internet and/or MAN or similar communications network, as is shown by outgoing line 11 in FIG. 1.

Further details of the access node 10 can be obtained from WO97/50230 corresponding to US patent application titled "Telecommunications Switch including an Integrated Internet Access Server" filed 24 Jun. 1996 and assigned to Telefonaktiebolaget L M Ericsson, the contents of which is incorporated herein by reference.

In this example a special WWW server 12 is connected to the access node 10 and is owned or operated by the operator of the telecommunication network. However, the WWW server 12 may also be located elsewhere, e.g. at the local exchange or closely adjacent thereto. Furthermore, a centralised WWW server can also be used, wherein user terminals outside various local exchanges can be connected to the centralised WWW server. The centralised WWW server may even be located outside the particular network concerned or outside another network.

The connection from the terminal 1 to the server 12 may utilise PPP (Point to Point Protocol) or SLIP (Serial Line Internet Protocol) or similar protocol. The connection from the terminal 1 to the telephone exchange 9 may for instance be an ISDN or POTS line, a wireless connection, such as a digital GSM connection (Global System for Mobile communications), or an analogue NMT (Nordic Mobile Telephone) connection or similar. It is also possible, but not necessary, to control the call by means of an intelligent network arrangement (IN). The WWW server 12 may also use the IN as a database. The connection between the user terminal 1 and the WWW server 12 is made secure in a manner which will be described in more detail below.

The server 12 implements a set of so-called web pages or documents, which can be accompanied with CGI scripts (Computer Graphics Interface), Java™ applets and other possible tools. The web pages provide the subscriber with a possibility to receive information about different features and/or services, and to control and manage them in an appropriate manner, such as to activate or deactivate them or to call for a new service or to delete an existing service. The inquiry, request, etc., messages can, for example, be sent in the form of http messages (hyper text transfer protocol). The server 12 includes a database 13 including all subscriber related records and individual web pages for each subscriber.

FIG. 1 shows one exemplary web page 14, which is shown to the user through a graphical interface or a display of the user terminal 1. The page 14 includes icons 15 which can be "clicked" by the user if he/she decides to access a feature which is beyond that particular icon. These web pages or documents in general are in the Internet environment called "hyperdocuments".

As has already been mentioned, a telephone subscriber is connected to the exchange 9 via a subscriber line 8. This line 8 may terminate at a local exchange or at a locally situated concentrator (multiplexer-demultiplexer) and has associated with it a line identifier. This represents the telephone number of the subscriber (A-number). A subscriber's A-number is associated with the features which may be accessed, managed and controlled, using the WWW server 12. This association between the A-number and the features to be managed is used such that after having identified the user terminal on the basis of this characteristic the server 12 allows this particular user terminal access to the managing operations of the features. The arrangement is such that without this association it is not possible to manage the user related features by the particular terminal 1.

It is noted that as the operator knows the identity of the subscriber, the operator also has a record of the other telephone numbers and terminals of this subscriber in the same network. Thus it is possible that a set of telephone numbers or other characteristic features is associated with the same features to be managed (with e.g. one single managing document 6). It is also possible to extend this to mobile stations of the particular subscriber. However, different operators may have different policies and thus it is preferred that the subscriber is allowed to manage only the numbers of that specific operator through a single page.

To provide a secure network connection between the subscriber and the server 12, it is necessary that the server 12 identifies the terminal 1 or group of terminals from which a request originates. One preferred way of accomplishing this is to implement the server 12 directly in the protocol stack terminating the PPP connection 3 from the terminal 1. This means that one version of the server software is entirely reserved for a particular subscriber, i.e. in FIG. 1 one version is reserved for each terminal 1. As explained above, the server 12 knows at least one of the characteristics of the subscriber terminal, such as the A-number.

Figure 2:
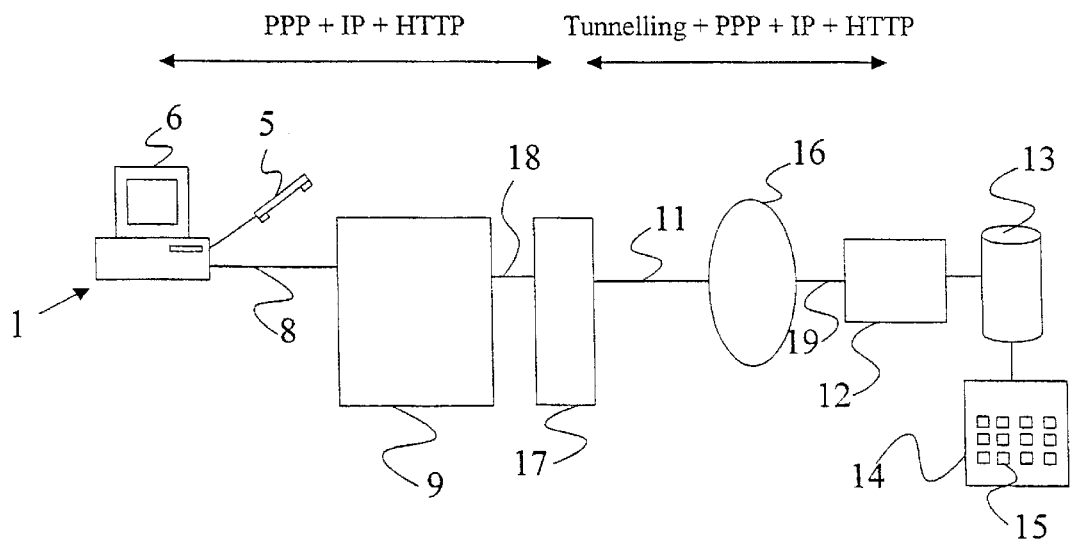
FIG. 2 is a schematic representation of an alternative embodiment of the present invention.

FIG. 2 discloses an alternative arrangement, according to which the access server 12 is positioned beyond a second network 16. In this, the connections from the terminal 1 to the telephone exchange 5 and the trunk line(s) between the various exchanges of the network correspond to those of FIG. 1. However, the access node 17 in not a part of the telephone network, but is connected thereto by a connection 18. From the access node 17 the connection to the server 12 is tunnelled through the second network 16. The connection 18 to the network 16 (e.g. Internet) and the connection 19 from the network 16 may be implemented by way of IP, so that the tunnelling protocol above the IP prevents the user's data from being visible to the other users of the network, prevents other users of the network from sending data to the WWW server 12, and transmits the characteristics of the subscriber to the WWW server 12.

Figures 3, 4:
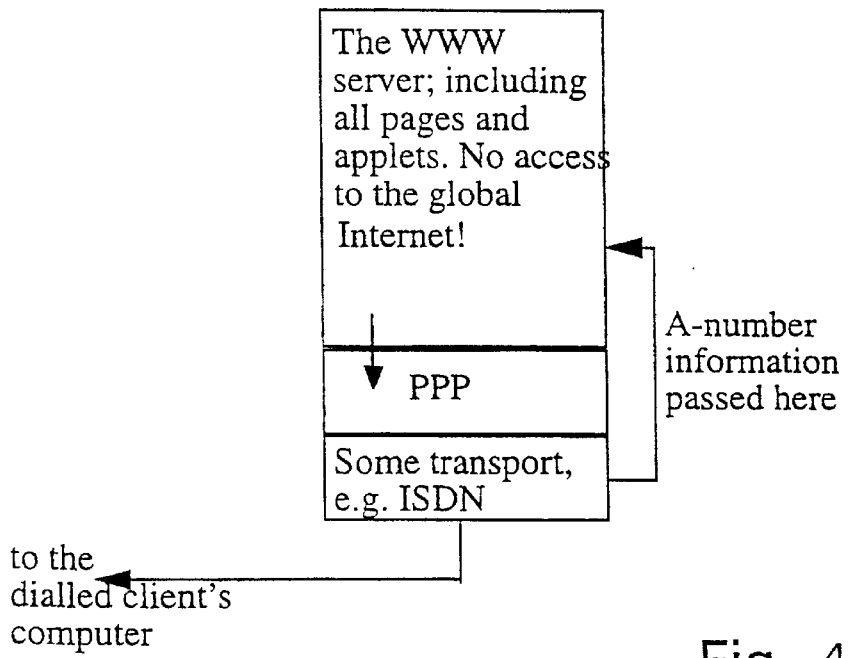
FIG. 3 is an example of a table displayed to the user.
FIG. 4 is a schematic representation of the principles of certain embodiments of the present invention.

FIG. 3 discloses an example of one possible page 14 to be displayed to the user on request. This page 14 is used for managing call forwarding operations. The features to be managed by the user are call forwarding "on" and "off" and the time and other settings for the call forwarding and so on, as is evident from the Figure. By clicking "modify", a further page becomes visible which may include various other alternatives, and even links to further pages.

FIG. 4 illustrates schematically the operational principles of the preferred embodiment of the invention. As is shown, the A-number information is passed to the server 12 as an input. The server 12 is isolated from the surrounding communications networks (e.g. Internet such that the A-number is the sole input which can be given to it. Only after having identified the A-number does the server 12 send as a response the main page of the hyperdocument to the display of the terminal, such as a PC, through the PPP connection and the transfer line, such as ISDN or POTS, as is indicated by the arrows. As the connection between the server 12 and the terminal 1 is "closed" and it can only be established by the server 12, it is possible to provide a secure response connection for the management of the various subscriber related features. In other words, a "closed management circuit" becomes established. As explained above, the PPP termination can take place either in the local exchange or alternatively in a centralised server with the help of some tunnelling protocol. If the PPP is terminated at the centralised server, the IP packets carried by the PPP are not allowed to access any of the IP networks, i.e. outside e.g. the ISDN/POTS line, and thus the particular instance of the centralised server can interact with only one particular PPP connection. This means that one instance of the server software is now entirely reserved for one subscriber.

The server may be provided with knowledge of the telephone number(s) of the subscriber for the identification and authorisation purposes in the form of a table. Standard tunnelling protocols, such as L2TP (Layer 2 Tunnelling Protocol) of IETF, convey this A-number information, and thus the server, such as the WWW server 12, can terminate the tunnel, extract the telephone number-information, start a new version of the web server program, and give it the telephone number or subscriber's A-number as an input. In practice the arrangement is such that the terminal 1 can only communicate towards the server 12, but the server 12 is allowed to communicate towards any number.

The term tunnelling generally refers to an encapsulation of protocol A within protocol B such that A treats B as if it were a datalink layer. Tunnelling is used to get data between administrative domains which use a protocol that is not supported, e.g. by the Internet connecting said domains.

Figure 5:
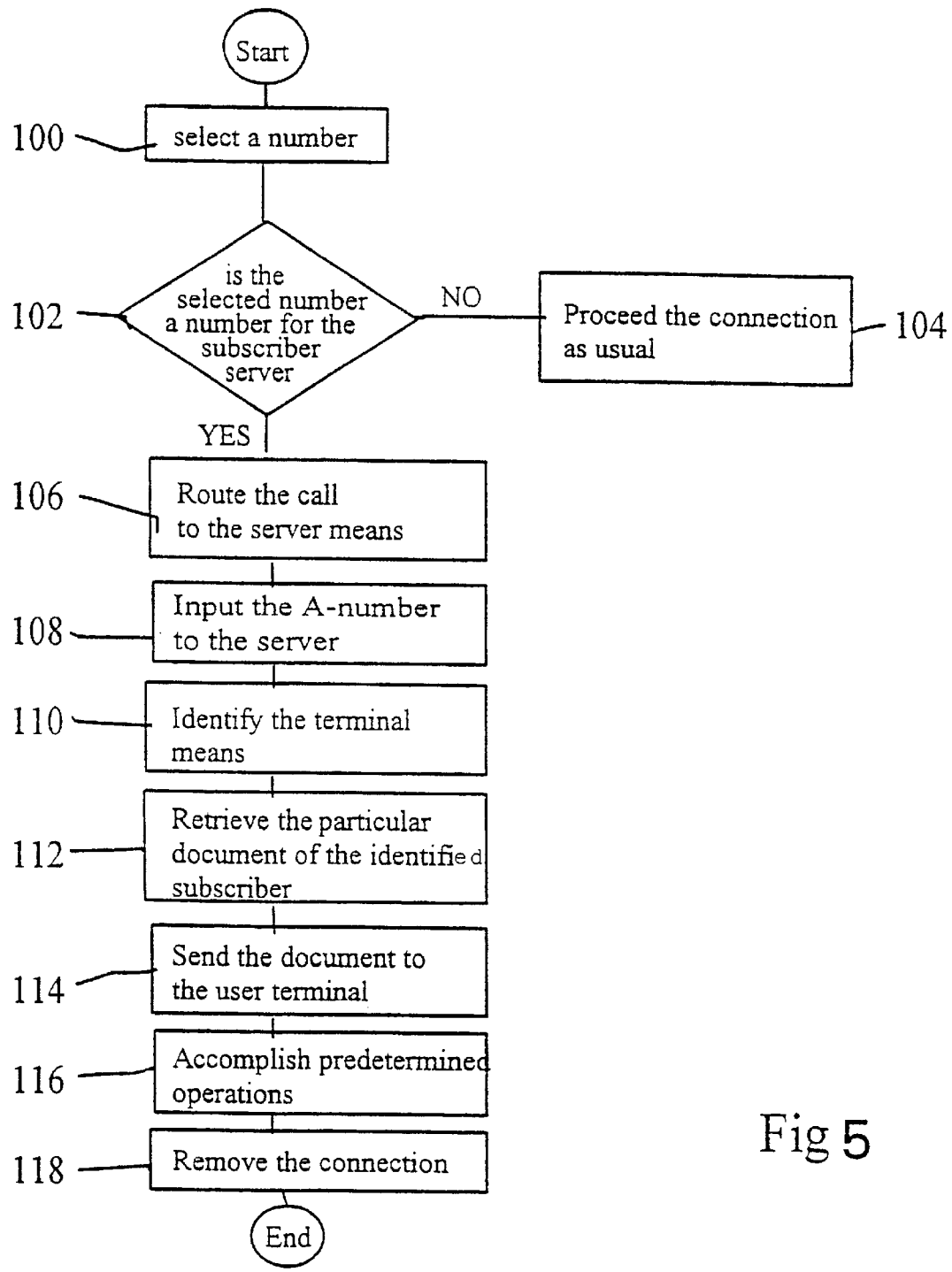
FIG. 5 is a flow chart in accordance with one embodiment of the present invention.

The flow chart of FIG. 5 illustrates further the steps according to one embodiment of the present invention.

The procedure starts as the user selects a telephone number and thus makes a call, step 100. In step 102 it is verified, for instance by the exchange, whether the desired number is the number of the server 12 or some other number. In case the call is intended to be connected to a normal number and no management operations are desired, the call will then proceed as usual (step 104). However, if the management services are desired to be accessed and thus the selected number is the number to the management services, the call will be routed to the server 12, step 106, e.g. via a PPP connection. The A-number will be given to the server as an input, step 108, whereafter the server identifies the calling number (or terminal), step 110.

In case the number is identified as one of the managed numbers the server 12 retrieves a correct web document from a database thereof, step 112. This document will then be sent back to the terminal from which the request originated, such as to the computer connected to the network, step 114. The user is now provided with a web document enabling a graphical interface for the management operations, whereby he/she can browse and select the features he/she wishes to configure or access, step 116. After all desired operations are done, the page is closed and the connection is removed, step 118. However, it is clear that the user may retrieve more than one page before closing the connection. In addition, the user may also have and browse several "retrieved" pages simultaneously.

In some instances, it might also be useful to arrange the server 12 to respond to so called DNS (Domain Name Server) enquiries. By means of the DNS it is possible to find the addresses of the various servers, such as 'www.ericsson.com'. If the server responds to all DNS enquiries by it's own address, or alternatively routes internally all packets to itself regardless of the address of the packets, the user will always access the configuration pages regardless of the initial page of the particular user. If another way of accessing the configuration page(s) is utilised, the user has to retrieve the correct address from a so called bookmark list or to remember it.

The invention provides an apparatus and a method by which a significant improvement can be achieved in the area of managing of features of a communications network. The arrangement according to the present invention is easy and economical to realise by per se known components and is reliable in use. It should be noted that the foregoing examples of the embodiments of the invention are not intended to restrict the scope of the invention defined in the appended claims. All additional embodiments, modifications and applications obvious to those skilled in the art are thus included within the spirit and scope of the invention as set forth by the claims appended hereto.

What is claimed is:

1. A method for managing a communication network such that a user in a communication network environment is enabled to manage user related features provided in the network through a user interface, comprising:

initiating a call from the user interface to a server provided with a feature management service including an individual register of characteristics and associated available features for user interfaces;

establishing said call between the user interface and said server using a tunneling protocol;

identifying the user interface using at least one characteristic thereof transmitted to the server during the call initiating step; and enabling the user to manage the features associated to said at least one characteristic using said user interface.

2. A method according to claim 1, wherein the communication network is a telecommunication network enabling a subscriber to the network to make voice and data calls.

3. A method according to claim 2, wherein the user interface is connected to the network via a subscriber line having a line identifier associated with it, and said at least one characteristic used to identify the user interface is the line identifier.

4. A method according to claim 1, wherein the connection between the user interface and the server is a point-to-point (PPP) connection and wherein the method further includes implementing said server in a protocol stack into which said point-to-point (PPP) connection is terminated.

5. A method according to claim 1, wherein the server is a WWW server and the user interface is a data processing device.

6. A method according to claim 1, wherein management of the features is accomplished using at least one HTML-document retrieved from the server and presented to the user through a graphical display of the user interface.

7. A method for managing a communication network such that a user in a communication network environment is enabled to manage user related features provided in the network through a user interface, comprising:

initiating a call from the user interface to a server provided with a feature management service including an individual register of characteristics and associated available features for user interfaces;

establishing said call between the user interface and said server;

identifying the user interface using at least one characteristic thereof transmitted to the server during the call initiating step;

enabling the user to manager the features associated to said at least one characteristic using said user interface; and wherein said characteristic of said user interface is associated with a plurality of interface terminals belonging to the same user.

8. Apparatus for enabling a user in a communications network environment to manage user related features provided in said network through a user interface, comprising:

a server provided with a feature management service including an individual register of characteristics and associated available features for user interfaces;

call connection means for initiating and establishing a call from the user interface to the server using a tunneling protocol;

means for identifying the user interface using at least one characteristic thereof transmitted to the server during call initiation;

the server being arranged to enable the user to manage the features associated to said at least one characteristic using said user interface.

9. Apparatus according to claim 8, wherein the user interface is coupled to the communication network via a subscriber line having associated with it a line identifier, and the line identifier corresponds to said at least one characteristic.

10. Apparatus according to claim 8, wherein the connection between the user interface and the server is a point-to-point (PPP) connection and said server is implemented in a protocol stack to which said point-to-point connection is terminated.

11. Apparatus according to claim 8, wherein the server is a WWW server and the user interface is a data processing device.

12. Apparatus according to claim 8, wherein the interface comprises a display means arranged to display an HTML-document retrieved from said server to the user, the apparatus being such that the user is enabled to manage the features by means of said HTML-document.

13. Apparatus according to claim 12, wherein the HTML-document forms a call forwarding table by means of which the user is enabled to manage call forwarding functions.

14. Apparatus according to claim 8, wherein the server is implemented in connection with a local exchange.

15. An arrangement according to claim 8, wherein the server is in a form of a centralized server arranged to serve user interfaces associated with at least two local exchanges.

16. A server for enabling a user to manage user related features provided in a communications network environment through a user interface, comprising:

a feature management service including a database containing an individual register of characteristics and associated available features for user interfaces, wherein the server is arranged to identity the user interface using at least one characteristic of said user interface transmitted to the server during initiation of a call between the user interface and the server, wherein said server is arranged to terminate the user's access into said communication network and to enable the user to manage the features associated to said at least one transmitted characteristic through said user interface.

17. A server according to claim 16, wherein said database includes at least one managing document associated to said user and retrievable by said user through the user interface, the arrangement being such that the user is enabled to manage the features through a graphical display of the user interface.

18. A method for enabling an user in a communications network environment to manage user related features provided in said network through a user interface, comprising:

establishing a call to a server provided with a feature management service including an individual register of characteristics and available features for a predetermined user interface limitedly reachable to said server;

terminating the user's access into the network through the user interface to said server;

identifying the user interface using at least one characteristic of said user interface;

inputting said characteristic into said server; and enabling the user to manage the features associated to said at least one inputted characteristic through said user interface.

19. Arrangement for enabling a user in an open communications network environment to manage user related features provided in said network through a user interface, comprising:

a server provided with a feature management service including an individual register of characteristics and available features for predetermined user interface which are limitedly reachable to said server;

wherein the server is arranged to identify the user interface using at least one characteristic of said user interface and for inputting said characteristic into the server after the identification, the arrangement being such that the user's access into the network is terminated to the server and that said server is arranged to enable the user to manage the features associated to said at least one inputted characteristic through said user interface.

20. A server for enabling a user to manage user related features provided in a communications network environment through a user interface, comprising:

a feature management service including a database containing an individual register of characteristics and available features for predetermined user, wherein the server is arranged to identify the user interface using at least one characteristic of said user interface, wherein said server is arranged to terminate the user's access into said communications network and arranged to enable the user to manage the features associated to at least one inputted characteristic through said user interface.

\* \* \* \* \*